No. 765,566. PATENTED JULY 19, 1904.
W. W. DOW.
EYEGLASSES.
APPLICATION FILED FEB. 5, 1904.
NO MODEL.

Witnesses;
John E. Porter
J. Murphy

Inventor,
Willard W. Dow
by Jas. H. Churchill
Atty.

No. 765,566.

Patented July 19, 1904.

UNITED STATES PATENT OFFICE.

WILLARD W. DOW, OF MALDEN, MASSACHUSETTS.

EYEGLASSES.

SPECIFICATION forming part of Letters Patent No. 765,566, dated July 19, 1904.

Application filed February 5, 1904. Serial No. 192,132. (No model.)

*To all whom it may concern:*

Be it known that I, WILLARD W. DOW, a citizen of the United States, residing in Malden, in the county of Middlesex and State of Massachusetts, have invented an Improvement in Eyeglasses, of which the following description, in connection with the accompanying drawings, is a specification, like letters on the drawings representing like parts.

This invention relates to frameless or rimless eyeglasses, and has for its object to provide the same with nose guards or pieces which are free to move, so as to adapt themselves to the nose of the wearer, whereby the glasses may be held firmly on the nose without danger of injuring the same.

In accordance with this invention the clasps or settings are secured to the lenses above the longitudinal axes of the same and are provided with depending or downwardly-extended arms, from which extend laterally studs or pins upon which the nose guards or pieces are mounted to turn, so as to conform to the shape of the nose of the wearer. The nose guards or pieces are held in engagement with the nose with a yielding pressure created by the bridge-spring connecting the clasps or settings.

Injury to the metal parts of the eyeglasses by frequent putting on and taking off of the glasses is avoided by securing the settings or clasps to the lenses above the longitudinal axes of the same a sufficient distance to bring the pivots for the nose-guards substantially in line with said longitudinal axes.

These and other features of this invention will be pointed out in the claim at the end of this specification.

Figure 1:
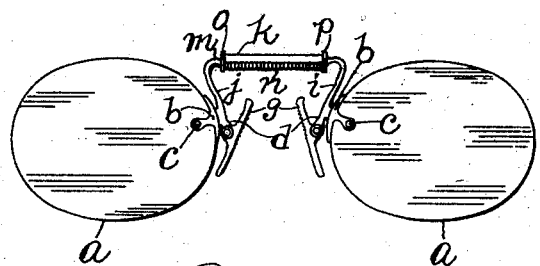
Figure 2:
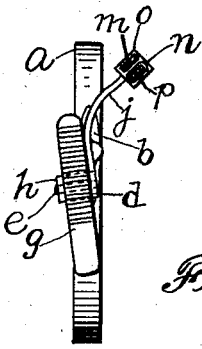
Figure 3:
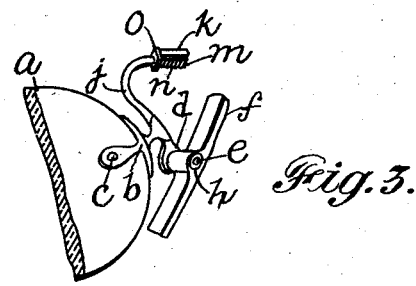

Figure 1 is an elevation of a pair of eyeglasses embodying this invention; Fig. 2, an enlarged section on the line 2 2, Fig. 1, looking toward the left; and Fig. 3, a detail in perspective to be referred to.

Referring to the drawings, the lenses $a$ have secured to them the settings or clasps $b$, which are fastened to said lenses by screws $c$, extended through the settings and through suitable holes made in the lenses above the longitudinal axes of the same.

The clasps or settings $b$ in accordance with this invention are provided with downwardly-extended arms $d$, having laterally-extended studs or pins $e$, constituting the pivots for the nose guards or pieces $f$, which may be made of celluloid, metal, or other suitable material and which may be provided with serrations $g$ or left smooth, as desired. The nose-guards $f$ turn freely on the studs or pins $e$ and may be retained thereon by washers $h$, secured on said pins or studs by upsetting the ends of the latter or in any other suitable manner. The arms $d$ are preferably made of sufficient length, and the pins or studs $e$ are so located on said arms as to bring the said studs or pins substantially in line with the longitudinal axes of said lenses.

The settings or clasps are connected by a yielding bridge, which may be of any usual or suitable construction and in the present instance is shown as consisting of arms $i\ j$, extended upwardly from the settings or clasps and provided with substantially flat horizontal portions $k\ m$, which slide on each other and are acted upon by a helical spring $n$, encircling one of said horizontal members between the end pieces or heads $o\ p$ on said members.

From an inspection of the drawings it will be seen that the pivoted nose-guards are free to turn, so as to conform to the shape of the nose, and thereby obtain a broad and firm bearing or engagement therewith without exerting severe and oftentimes painful pressure on the nose.

It is further to be observed that the pivoted guard is attached to a setting or clasp which is small and requires but a single hole to be made in the lens for attachment thereto.

By connecting the settings or clasps to the lenses above the longitudinal axes thereof the pivots for the nose-guards are brought substantially in line with said axes and the length of the upwardly-extended arms $i\ j$ of the bridge is shortened, so that they are less liable to be bent, distorted, or broken when the lenses are separated in the act of putting on or taking off the glasses.

I may prefer to employ the spring-bridge herein shown; but I do not desire to limit my invention in this respect, as the invention is equally applicable to rimless eyeglasses in which the clasps or settings are connected by a single strip of spring metal, as now commonly employed in eyeglasses.

I claim—

In a rimless eyeglass, in combination, two lenses, a setting or clasp secured to each lens above the longitudinal axis of said lens, an arm extended downwardly from each setting or clasp, a stud or pin extended laterally from each of said arms and substantially in line with the longitudinal axis of said lens, a noseguard loosely mounted on each stud or pin, and a bridge connecting said settings or clasps, substantially as described.

In testimony whereof I have signed my name to this specification in the presence of two subscribing witnesses.

WILLARD W. DOW.

Witnesses:
JAS. H. CHURCHILL,
J. MURPHY.